(12) United States Patent
Chen et al.

(10) Patent No.: US 10,966,208 B2
(45) Date of Patent: Mar. 30, 2021

(54) VOICE SERVICE PROCESSING METHOD AND APPARATUS

(71) Applicant: HUAWEI TECHNOLOGIES CO., LTD., Guangdong (CN)

(72) Inventors: Jun Chen, Shanghai (CN); Xiaoxiao Zheng, Shanghai (CN)

(73) Assignee: HUAWEI TECHNOLGIES CO., LTD., Guangdong (CN)

( * ) Notice: Subject to any disclaimer, the term of this patent is extended or adjusted under 35 U.S.C. 154(b) by 0 days.

(21) Appl. No.: 16/123,076

(22) Filed: Sep. 6, 2018

(65) Prior Publication Data

US 2019/0007936 A1 Jan. 3, 2019

Related U.S. Application Data

(63) Continuation of application No. PCT/CN2016/075945, filed on Mar. 9, 2016.

(51) Int. Cl.
*H04W 72/04* (2009.01)
*H04W 28/22* (2009.01)
*H04L 29/06* (2006.01)
*H04W 28/18* (2009.01)
*H04W 92/10* (2009.01)

(52) U.S. Cl.
CPC ......... *H04W 72/048* (2013.01); *H04L 29/06* (2013.01); *H04L 65/1016* (2013.01); *H04L 65/1069* (2013.01); *H04W 28/18* (2013.01); *H04W 28/22* (2013.01); *H04W 72/0413* (2013.01); *H04W 92/10* (2013.01)

(58) Field of Classification Search
CPC . H04L 29/06; H04L 65/1016; H04L 65/1069; H04W 28/18; H04W 28/22; H04W 72/0413; H04W 72/048; H04W 92/10
USPC ......................................................... 455/450
See application file for complete search history.

(56) References Cited

U.S. PATENT DOCUMENTS

| 8,072,934 | B2 | 12/2011 | Vikberg et al. |
| 9,723,030 | B2 * | 8/2017 | Hedman ............ H04W 36/0011 |
| 10,306,579 | B2 * | 5/2019 | Zhang .................. H04W 12/06 |

(Continued)

FOREIGN PATENT DOCUMENTS

| CN | 102917328 A | 2/2013 |
| CN | 103796243 A | 5/2014 |

(Continued)

OTHER PUBLICATIONS

Sheri DeTomasi, "5G mmWave MIMO Channel Sounding", Keysight Technologies, Sep. 2015, 37 pages.

*Primary Examiner* — Charles T Shedrick
(74) *Attorney, Agent, or Firm* — Womble Bond Dickinson (US) LLP

(57) ABSTRACT

A voice service processing method and an apparatus are provided. The method includes: receiving, by a base station, voice configuration indication information from user equipment (UE), where the voice configuration indication information is used to indicate at least one voice configuration supported by the UE; and configuring, by the base station, a voice transmission scheme for the UE based on the voice configuration indication information. The UE can initiate a voice service on a 5G network, and a high-quality and convenient voice service can be provided for a user.

11 Claims, 7 Drawing Sheets

(56) References Cited

U.S. PATENT DOCUMENTS

| | | | |
|---|---|---|---|
| 2003/0179873 A1* | 9/2003 | Chen | H04L 29/06 379/219 |
| 2007/0142041 A1* | 6/2007 | Wood | H04M 1/72563 455/418 |
| 2007/0165573 A1* | 7/2007 | Hietalahti | H04W 8/02 370/331 |
| 2010/0070632 A1* | 3/2010 | Song | H04W 76/16 709/227 |
| 2010/0113010 A1* | 5/2010 | Tenny | H04L 47/10 455/423 |
| 2011/0235546 A1* | 9/2011 | Horn | H04W 48/17 370/254 |
| 2011/0310799 A1* | 12/2011 | Horn | H04W 76/11 370/328 |
| 2013/0063540 A1* | 3/2013 | Zisimopoulos | H04W 36/0022 348/14.02 |
| 2013/0189951 A1 | 7/2013 | Lopez et al. | |
| 2014/0169788 A1 | 6/2014 | Hussain et al. | |
| 2014/0376513 A1* | 12/2014 | Poikselka | H04W 36/0022 370/331 |
| 2015/0050924 A1* | 2/2015 | Gotou | H04W 88/02 455/418 |
| 2015/0055554 A1 | 2/2015 | Sedlacek et al. | |
| 2015/0215965 A1* | 7/2015 | Yamada | H04W 36/0069 370/329 |
| 2015/0304937 A1* | 10/2015 | Kim | H04W 80/10 370/230 |
| 2015/0327107 A1 | 11/2015 | Kim et al. | |
| 2016/0029303 A1* | 1/2016 | Sahu | H04W 60/005 370/331 |
| 2016/0073299 A1* | 3/2016 | Liang | H04L 65/80 370/331 |
| 2016/0135093 A1* | 5/2016 | Wong | H04W 36/0022 370/331 |
| 2017/0201933 A1* | 7/2017 | Krishnamoorthy | H04W 48/14 |
| 2017/0208488 A1* | 7/2017 | Hwang | H04W 76/34 |
| 2017/0230818 A1* | 8/2017 | Park | H04W 8/02 |
| 2017/0311151 A1* | 10/2017 | Ohashi | H04L 65/1016 |
| 2018/0020418 A1* | 1/2018 | Chandramouli | H04W 16/14 |
| 2018/0070404 A1* | 3/2018 | Giguet | H04W 52/0216 |
| 2018/0103389 A1* | 4/2018 | Li | H04L 1/0014 |
| 2019/0082500 A1* | 3/2019 | Shi | H04W 60/04 |
| 2019/0116551 A1* | 4/2019 | Faccin | H04W 48/18 |

FOREIGN PATENT DOCUMENTS

| | | | |
|---|---|---|---|
| CN | 104081741 A | | 10/2014 |
| WO | WO2013048189 | * | 4/2013 |
| WO | 2015135198 A1 | | 9/2015 |

* cited by examiner

VOICE SERVICE PROCESSING METHOD AND APPARATUS

CROSS-REFERENCE TO RELATED APPLICATIONS

This application is a continuation of International Application No. PCT/CN2016/075945, filed on Mar. 9, 2016, the disclosure of which is hereby incorporated by reference in its entirety.

TECHNICAL FIELD

The present disclosure relates to communications technologies, and in particular, to a voice service processing method and an apparatus.

BACKGROUND

As a mobile communications network develops rapidly, a $5^{th}$ generation (5G) wireless communications technology has become a current focus in the industry. Compared with a $4^{th}$ generation (4G) wireless communications technology, the 5G aims to provide a higher speed, more connections, and a shorter delay and support abundant services. Therefore, the 5G has been an inevitable development trend of the mobile communications network.

Currently, a voice service is a main service of the mobile communications network, and the mobile communications network provides a voice service such as video voice or non-video voice for user equipment (UE). For example, in a $2^{nd}$ generation (2G) wireless communications technology system and a $3^{th}$ generation (3G) wireless communications technology system, circuit switched (CS) voice is mainly provided. In a 4G system, voice is mainly provided by using an IP multimedia subsystem (IMS). However, in a current 5G communications standard, no voice solution has been specified, and no voice service implementation solution has been provided on a 5G network.

SUMMARY

The present disclosure provides a voice service processing method and an apparatus, so that UE can initiate a voice service on a 5G network, and a high-quality and convenient voice service can be provided for a user.

In at least some embodiments, a voice service processing method includes: receiving, by a base station, voice configuration indication information from UE, where the voice configuration indication information is used to indicate at least one voice configuration supported by the UE; and configuring, by the base station, a voice transmission scheme for the UE based on the voice configuration indication information. The base station configures the voice transmission scheme for the UE based on the voice configuration indication information, and provides a 5G network voice solution, so that the UE can initiate a voice service on a 5G network, and a high-quality and convenient voice service can be provided for a user.

In at least some embodiments, the voice configuration indication information is first indication information; the base station receives the first indication information from the UE, where the first indication information is used to indicate that the UE supports 5G and an NG-IMS; and the base station configures a first voice transmission scheme for the UE based on the first indication information, where the first voice transmission scheme is that a transmission path of a voice service is from a 5G CN to the NG-IMS. This implements that the base station configures the voice transmission scheme for the UE based on the voice configuration indication information.

In at least some embodiments, the base station establishes a voice channel from the 5G CN to the NG-IMS based on the first indication information; and the base station sends a voice channel establishment indication message to the UE, where the voice channel establishment indication message is used to indicate that the transmission path of the voice service of the UE is from the 5G CN to the NG-IMS. This implements that the base station configures the first voice transmission scheme for the UE based on the first indication information.

In at least some embodiments, the voice configuration indication information is second indication information; the base station receives second indication information from the UE, where the second indication information is used to indicate that the UE supports 5G and an IMS; and the base station configures a second voice transmission scheme for the UE based on the second indication information, where the second voice transmission scheme is that a transmission path of a voice service is from a 5G CN to the IMS. This implements that the base station configures the voice transmission scheme for the UE based on the voice configuration indication information.

In at least some embodiments, the base station establishes a voice channel from the 5G CN to the IMS based on the second indication information; and the base station sends a voice channel establishment indication message to the UE, where the voice channel establishment indication message is used to indicate that the transmission path of the voice service of the UE is from the 5G CN to the IMS. This implements that the base station configures the second voice transmission scheme for the UE based on the second indication information.

In at least some embodiments, the base station receives the third indication information from the UE, where the third indication information is used to indicate that the UE supports an MSC or an eMSC; and the base station configures a third voice transmission scheme for the UE based on the third indication information, where the third voice transmission scheme is that a transmission path of a voice service is from the MSC or the eMSC to an IMS. This implements that the base station configures the voice transmission scheme for the UE based on the voice configuration indication information.

In at least some embodiments, the base station establishes a voice channel from the MSC or the eMSC to the IMS based on the third indication information; and the base station sends a voice channel establishment indication message to the UE, where the voice channel establishment indication message is used to indicate that the transmission path of the voice service of the UE is from the MSC or the eMSC to the IMS. This implements that the base station configures the third voice transmission scheme for the UE based on the third indication information.

In at least some embodiments, after the configuring, by the base station, a voice transmission scheme for the UE based on the voice configuration indication information, the base station receives voice service indication information from the UE, where the voice service indication information is used to indicate at least one voice service supported by the UE; and the base station configures at least one AI for the UE based on the voice service indication information, where each AI is used to carry at least one voice service. The base station configures the at least one AI for the UE based on the voice service indication information, and carries the at least one voice service by using the AI, to implement carrying of the voice service.

In at least some embodiments, the base station selects at least one unoccupied AI based on the voice service indication information, and configures the at least one unoccupied AI for the UE; or the base station selects, based on the voice service indication information, at least one AI whose occupancy is less than a preset value, and configures, for the UE, the at least one AI whose occupancy is less than the preset value. This implements that the base station configures the at least one AI for the UE based on the voice service indication information.

In at least some embodiments a voice service processing method includes: accessing, by UE, a base station; and sending, by the UE, voice configuration indication information to the base station, where the voice configuration indication information is used to indicate at least one voice configuration supported by the UE, so that the base station configures a voice transmission scheme for the UE based on the voice configuration indication information. A 5G network voice solution is provided, so that the UE can initiate a voice service on a 5G network, and a high-quality and convenient voice service can be provided for a user.

In at least some embodiments, the sending, by the UE, voice configuration indication information to the base station, so that the base station configures a voice transmission scheme for the UE based on the voice configuration indication information includes the following several cases: the UE sends first indication information to the base station, where the first indication information is used to indicate that the UE supports 5G and an NG-IMS, so that the base station configures a first voice transmission scheme for the UE based on the first indication information, and the first voice transmission scheme is that a transmission path of a voice service is from a 5G CN to the NG-IMS; or the UE sends second indication information to the base station, where the second indication information is used to indicate that the UE supports 5G and an IMS, so that the base station configures a second voice transmission scheme for the UE based on the second indication information, and the second voice transmission scheme is that a transmission path of a voice service is from a 5G CN to the IMS; or the UE sends third indication information to the base station, where the third indication information is used to indicate that the UE supports an MSC or an eMSC, so that the base station configures a third voice transmission scheme for the UE based on the third indication information, and the third voice transmission scheme is that a transmission path of a voice service is from the MSC or the eMSC to an IMS. The UE may send one of the first indication information, the second indication information, and the third indication information to the base station, so that the base station configures a voice transmission scheme for the UE based on one of the first indication information, the second indication information, and the third indication information.

In at least some embodiments, after the sending, by the UE, voice configuration indication information to the base station, the UE sends voice service indication information to the base station, where the voice service indication information is used to indicate at least one voice service supported by the UE, so that the base station configures at least one AI for the UE based on the voice service indication information, where each AI is used to carry at least one voice service. The UE sends the voice service indication information to the base station, so that the base station configures the at least one AI for the UE based on the voice service indication information, and carries the at least one voice service by using the AI, to implement carrying of the voice service.

In at least some embodiments a base station includes: a receiver, configured to receive voice configuration indication information from UE, where the voice configuration indication information is used to indicate at least one voice configuration supported by the UE; and a processor, configured to configure a voice transmission scheme for the UE based on the voice configuration indication information. The base station configures the voice transmission scheme for the UE based on the voice configuration indication information, and provides a 5G network voice solution, so that the UE can initiate a voice service on a 5G network, and a high-quality and convenient voice service can be provided for a user.

In at least some embodiments, a user equipment includes: a processor, configured to access a base station; and a transmitter, configured to send voice configuration indication information to the base station after the UE accesses the base station, where the voice configuration indication information is used to indicate at least one voice configuration supported by the UE, so that the base station configures a voice transmission scheme for the UE based on the voice configuration indication information. A 5G network voice solution is provided, so that the UE can initiate a voice service on a 5G network, and a high-quality and convenient voice service can be provided for a user.

In at least some embodiments a base station includes: a receiving module, configured to receive voice configuration indication information from UE, where the voice configuration indication information is used to indicate at least one voice configuration supported by the UE; and a configuration module, configured to configure a voice transmission scheme for the UE based on the voice configuration indication information. The base station configures the voice transmission scheme for the UE based on the voice configuration indication information, and provides a 5G network voice solution, so that the UE can initiate a voice service on a 5G network, and a high-quality and convenient voice service can be provided for a user.

In at least some embodiments, a user equipment includes: an access module, configured to access a base station; and a sending module, configured to send voice configuration indication information to the base station after the UE accesses the base station, where the voice configuration indication information is used to indicate at least one voice configuration supported by the UE, so that the base station configures a voice transmission scheme for the UE based on the voice configuration indication information. A 5G network voice solution is provided, so that the UE can initiate a voice service on a 5G network, and a high-quality and convenient voice service can be provided for a user.

In at least some embodiments, the base station receives the voice configuration indication information from the UE, where the voice configuration indication information is used to indicate the at least one voice configuration supported by the UE; and the base station configures the voice transmission scheme for the UE based on the voice configuration indication information, and provides a 5G network voice solution, so that the UE can initiate a voice service on a 5G network, and a high-quality and convenient voice service can be provided for a user.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may derive other drawings from these accompanying drawings.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the embodiments of the present disclosure.

Figure 1:
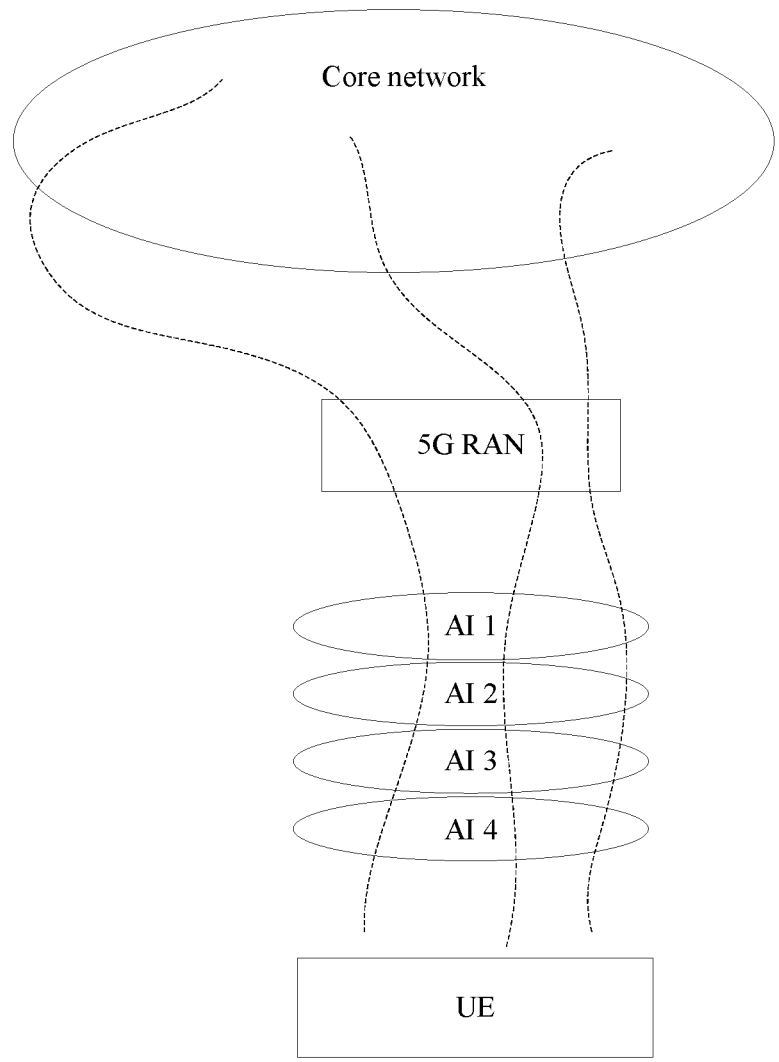
FIG. 1 is a system architectural diagram of a 5G system according to one embodiment of the present disclosure.

FIG. 1 is a system architectural diagram of a 5G system according to one embodiment of the present disclosure. As shown in FIG. 1, in a $5^{th}$ generation wireless communications technology system, when user equipment (UE) needs to make a call or is called, the UE is connected to a 5G core network (CN) by using a 5G radio access network (RAN), and the UE may initiate a voice service to the 5G RAN by using one or more air interfaces (AI), for example, one or more of an AI 1, an AI 2, an AI 3, and an AI 4 in FIG. 1. The air interface is an air interface in mobile communications. The voice service may include video voice and non-video voice.

Descriptions below are used to describe in detail at least some embodiments of the technical solutions of the present disclosure. The following several specific embodiments may be combined with each other, and a same or similar concept or process may not be described repeatedly in some embodiments.

Figure 2:
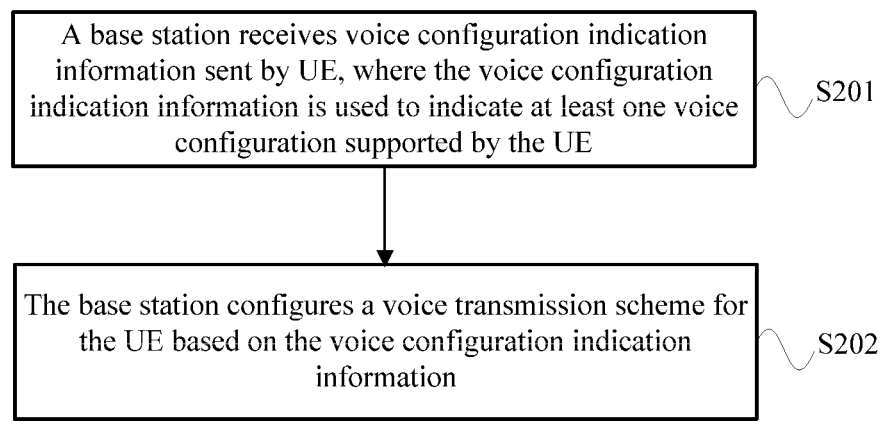
FIG. 2 is a flowchart of a voice service processing method according to one embodiment of the present disclosure.

FIG. 2 is a flowchart of a voice service processing method according to one embodiment of the present disclosure. As shown in FIG. 2, the voice service processing method provided in one embodiment of the present disclosure includes the following operations.

S201. A base station receives voice configuration indication information sent by UE, where the voice configuration indication information is used to indicate at least one voice configuration supported by the UE.

For example, when the UE needs to make a call or is called, the UE accesses a 5G RAN, to access the base station, and sends the voice configuration indication information to the base station after the access by using the 5G RAN; and the UE reports, to the base station, the voice configuration supported by the UE.

It should be noted that the base station in one embodiment of the present disclosure is a 5G base station.

S202. The base station configures a voice transmission scheme for the UE based on the voice configuration indication information.

For example, after obtaining the voice configuration indication information sent by the UE, the base station configures at least one voice transmission scheme for the UE based on the voice configuration supported by the UE. In one embodiment of the present disclosure, the base station selects the voice transmission scheme for the UE based on the voice configuration indication information sent by the UE, and provides a 5G network voice solution, so that the UE can initiate a voice service on a 5G network.

According to the voice service processing method provided in one embodiment of the present disclosure, the base station receives the voice configuration indication information sent by the UE, where the voice configuration indication information is used to indicate the at least one voice configuration supported by the UE; and the base station configures the voice transmission scheme for the UE based on the voice configuration indication information, and provides a 5G network voice solution, so that the UE can initiate a voice service on a 5G network, and a high-quality and convenient voice service can be provided for a user.

Figure 3:
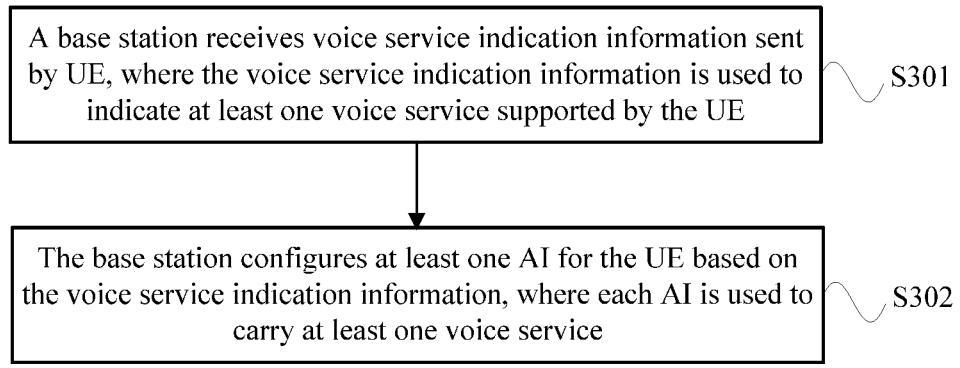
FIG. 3 is a flowchart of a voice service processing method according to one embodiment of the present disclosure.

FIG. 3 is a flowchart of a voice service processing method according to one embodiment of the present disclosure. As shown in FIG. 3, after S202, the voice service processing method provided in one embodiment of the present disclosure further includes the following operations:

S301. A base station receives voice service indication information sent by UE, where the voice service indication information is used to indicate at least one voice service supported by the UE.

S302. The base station configures at least one AI for the UE based on the voice service indication information, where each AI is used to carry at least one voice service.

For example, after the UE sends voice configuration indication information to the base station, the UE further sends the voice service indication information to the base station. The voice service indication information is used to indicate the at least one voice service (for example, video voice or non-video voice) supported by the UE. The base station receives the voice service indication information sent by the UE and configures the at least one AI for the UE, to carry a voice service. When the UE has a plurality of voice services (for example, video voice or non-video voice), the base station may configure one AI for each type of voice service.

Optionally, the configuring, by the base station, at least one AI for the UE based on the voice service indication information includes: selecting, by the base station, at least one unoccupied AI based on the voice service indication information, and configuring the at least one unoccupied AI for the UE; or selecting, by the base station based on the voice service indication information, at least one AI whose occupancy is less than a preset value, and configuring, for the UE, the at least one AI whose occupancy is less than the preset value.

For example, in a physical area, there are a plurality of air interfaces (AI), the plurality of air interfaces coexist, and each air interface is coverage that can provide and meet one type of service.

In one embodiment of the present disclosure, a to-be-allocated resource of an AI may be associated with a UE identifier. In this way, the AI learns identifier information of UE for which a voice service is being performed. An identifier of the AI that receives the voice service may be configured on the UE. In this way, the UE obtains the AI that initiates the voice service.

It should be noted that, in a 5G physical area, an AI is mainly manages a radio bearer technology used for carrying a service. The occupancy of the AI means a ratio of used bandwidth of the AI to total bandwidth of the AI or a ratio of a used resource of the AI to total resources of the AI. The preset value is determined based on a volume of allocated resources on the AI. For example, if there are more allocated resources on the AI, a larger preset value is set; and if there are fewer allocated resources on the AI, a smaller preset value is set. This is not limited in one embodiment of the present disclosure, and details are not described.

Further, in the foregoing embodiments, the receiving, by a base station, voice configuration indication information sent by UE and the configuring, by the base station, a voice transmission scheme for the UE based on the voice configuration indication information include the following several cases:

In a first case, the voice configuration indication information is first indication information. The base station receives the first indication information sent by the UE. The first indication information is used to indicate that the UE supports a $5^{th}$ generation wireless communications technology and a next generation IP multimedia subsystem.

Correspondingly, the base station configures a first voice transmission scheme for the UE based on the first indication information. The first voice transmission scheme is that a transmission path of a voice service is from a 5G core network to the next generation IP multimedia subsystem.

For example, when the base station configures a voice scheme for the UE based on the voice configuration indication information sent by the UE, if a voice configuration of the UE is that the UE supports the 5G and the next generation IP multimedia subsystem (NG-IMS), the voice scheme configured by the base station for the UE is that the UE accesses the NG-IMS by using the 5G core network (CN).

The 5G CN is used to perform operations such as voice bearer setup and modification. The NG-IMS is a next generation voice control entity of an IMS and is configured to provide voice services that are simpler and more abundant than those provided by the IMS.

Optionally, the configuring, by the base station, a first voice transmission scheme for the UE based on the first indication information includes: establishing, by the base station, a voice channel from the 5G CN to the NG-IMS based on the first indication information.

For example, the base station may send the first indication information to the 5G CN; the 5G CN initiates a voice channel establishment request to the NG-IMS; and after obtaining voice channel establishment response information from the NG-IMS, the base station sends a voice channel establishment indication message to the 5G CN. Alternatively, the base station initiates a voice channel establishment request to the 5G CN; the 5G CN forwards the request to the NG-IMS; and after obtaining voice channel establishment response information from the NG-IMS, the 5G CN sends a voice channel establishment indication message to the base station.

The base station sends the voice channel establishment indication message to the UE. The voice channel establishment indication message is used to indicate that the transmission path of the voice service of the UE is from the 5G CN to the NG-IMS.

In a second case, the voice configuration indication information is second indication information. The base station receives the second indication information sent by the UE. The second indication information is used to indicate that the UE supports a $5^{th}$ generation wireless communications technology and an IP multimedia subsystem.

Correspondingly, the base station configures a second voice transmission scheme for the UE based on the second indication information. The second voice transmission scheme is that a transmission path of a voice service is from a 5G core network to the IP multimedia subsystem.

For example, when the base station configures a voice scheme for the UE based on the voice configuration indication information sent by the UE, if a voice configuration of the UE is that the UE supports the 5G and the IP multimedia subsystem (IMS), the voice scheme configured by the base station for the UE is that the UE accesses the IMS by using the 5G core network (CN).

The IMS is a voice control entity in a multimedia service form and can support multiple access and abundant multimedia services.

Optionally, the configuring, by the base station, a second voice transmission scheme for the UE based on the second indication information includes: establishing, by the base station, a voice channel from the 5G CN to the IMS based on the second indication information.

For example, the base station may send the second indication information to the 5G CN; the 5G CN initiates a voice channel establishment request to the IMS; and after obtaining voice channel establishment response information from the IMS, the base station sends a voice channel establishment indication message to the 5G CN. Alternatively, the base station initiates a voice channel establishment request to the 5G CN; the 5G CN forwards the request to the IMS; and after obtaining voice channel establishment response information from the IMS, the 5G CN sends a voice channel establishment indication message to the base station.

The base station sends the voice channel establishment indication message to the UE. The voice channel establishment indication message is used to indicate that the transmission path of the voice service of the UE is from the 5G CN to the IMS.

In a third case, the voice configuration indication information is third indication information. The base station receives the third indication information sent by the UE. The third indication information is used to indicate that the UE supports a mobile switching center or an enhanced mobile switching center.

Correspondingly, the base station configures a third voice transmission scheme for the UE based on the third indication information. The third voice transmission scheme is that a transmission path of a voice service is from the mobile switching center or the enhanced mobile switching center to an IP multimedia subsystem.

For example, when the base station configures a voice scheme for the UE based on the voice configuration indication information sent by the UE, if a voice configuration of the UE is that the UE supports the mobile switching center (MSC) or the enhanced mobile switching center (eMSC), the voice scheme configured by the base station for the UE is that the UE accesses the IMS by using the MSC/eMSC.

The MSC/eMSC is a voice control entity in 2G and 3G, and may provide an agent/transit service from circuit switched (CS) voice to IMS voice.

Optionally, the configuring, by the base station, a third voice transmission scheme for the UE based on the third indication information includes: establishing, by the base station, a voice channel from the MSC or the eMSC to the IMS based on the third indication information.

For example, the base station may send the third indication information to the MSC or the eMSC; the MSC or the eMSC initiates a voice channel establishment request to the IMS; and after obtaining voice channel establishment response information from the IMS, the base station sends a voice channel establishment indication message to the MSC or the eMSC. Alternatively, the base station initiates a voice channel establishment request to the MSC or the eMSC; the MSC or the eMSC forwards the request to the IMS; and after obtaining voice channel establishment response information from the IMS, the MSC or the eMSC sends a voice channel establishment indication message to the base station.

The base station sends the voice channel establishment indication message to the UE. The voice channel establishment indication message is used to indicate that the transmission path of the voice service of the UE is from the MSC or the eMSC to the IMS.

The foregoing three cases may be performed on the base station side at the same time. In other words, the base station may receive one of the first indication information, the second indication information, and the third indication information sent by the UE. The base station may configure one of the first voice transmission scheme, the second voice transmission scheme, and the third voice transmission scheme for the UE based on network load, a network policy, and a UE priority, and then perform a subsequent process based on the foregoing descriptions.

Figure 4:
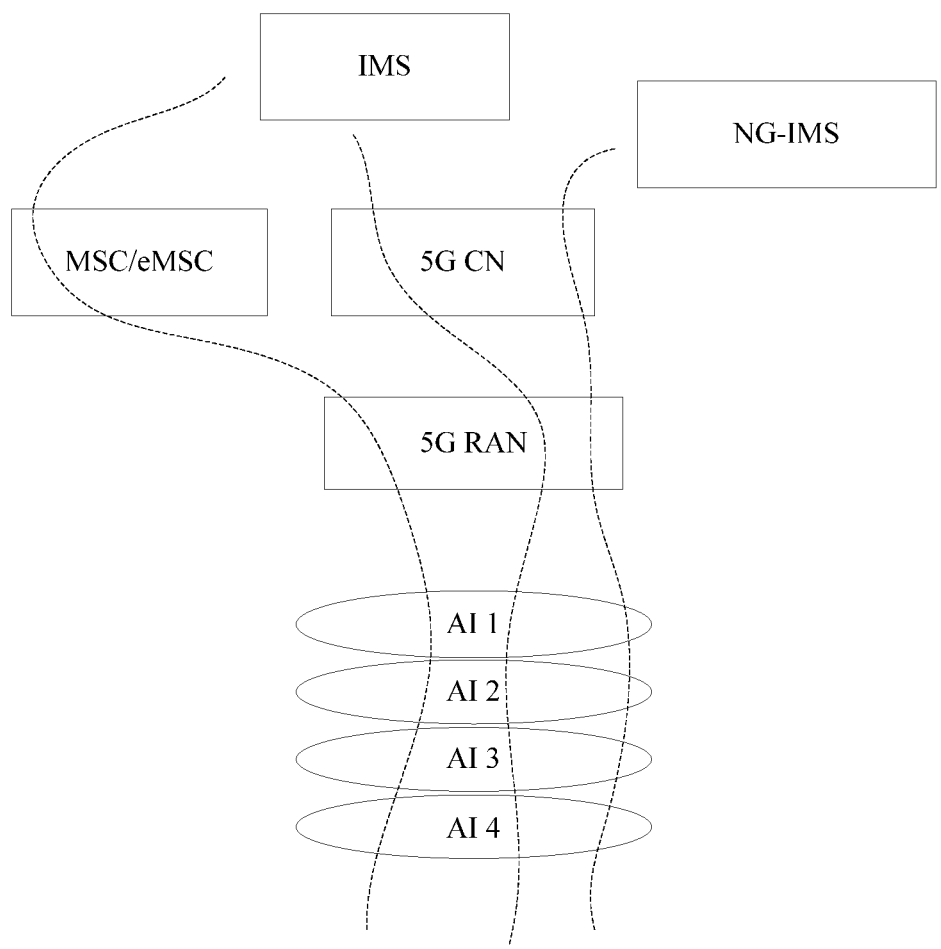
FIG. 4 is a system architectural diagram of a 5G system according to one embodiment of the present disclosure.

Further, in an embodiment of the present disclosure, FIG. 4 is a system architectural diagram of a 5G system according to one embodiment of the present disclosure. As shown in FIG. 4, a base station may configure at least one of three transmission paths for UE based on a voice configuration supported by the UE. The UE accesses an NG-IMS by using a 5G CN, accesses an IMS by using a 5G CN, and accesses an IMS by using an MSC/eMSC. A 5G RAN may carry voice by using one AI, or may carry voice by using a plurality of AIs. Each AI may correspondingly carry one type of voice service, for example, video voice or non-video voice. When the UE has a plurality of voice services, the base station may configure at least one AI for the UE. In FIG. 4, the base station configures four AIs: an AI 1, an AI 2, an AI 3, and an AI 4, for the UE.

According to the voice service processing method provided in one embodiment of the present disclosure, the base station receives the voice configuration indication information sent by the UE, where the voice configuration indication information is used to indicate at least one voice configuration supported by the UE; and the base station configures the voice transmission scheme for the UE based on the voice configuration indication information. In addition, the base station receives the voice service indication information sent by the UE, where the voice service indication information is used to indicate at least one voice service supported by the UE; and the base station configures the at least one AI for the UE based on the voice service indication information, and provides a 5G network voice solution, where each AI is used to carry at least one voice service, so that the UE can initiate a voice service on a 5G network, and a high-quality and convenient voice service can be provided for a user.

Figure 5:
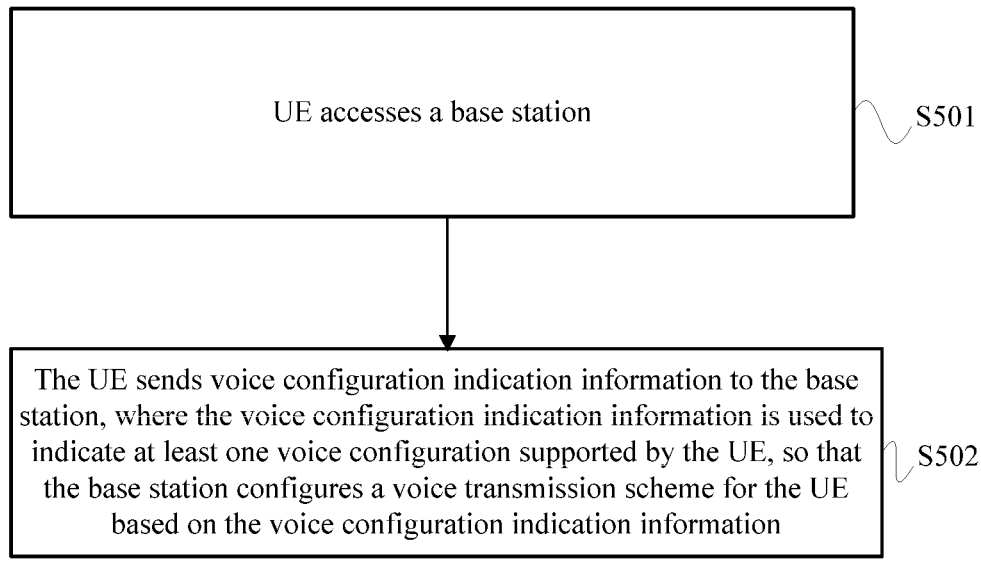
FIG. 5 is a flowchart of a voice service processing method according to one embodiment of the present disclosure.

FIG. 5 is a flowchart of a voice service processing method according to one embodiment of the present disclosure. As shown in FIG. 5, the voice service processing method provided in one embodiment of the present disclosure includes the following operations:

S501. UE accesses a base station.

For example, the UE accesses a 5G RAN, so as to access the base station.

S502. The UE sends voice configuration indication information to the base station, where the voice configuration indication information is used to indicate at least one voice configuration supported by the UE, so that the base station configures a voice transmission scheme for the UE based on the voice configuration indication information.

According to the voice service processing method provided in one embodiment of the present disclosure, the UE accesses the base station; the UE sends the voice configuration indication information to the base station, where the voice configuration indication information is used to indicate the at least one voice configuration supported by the UE, so that the base station configures the voice transmission scheme for the UE based on the voice configuration indication information and provides a 5G network voice solution; and the UE can initiate a voice service on a 5G network, and a high-quality and convenient voice service can be provided for a user.

Figure 6:
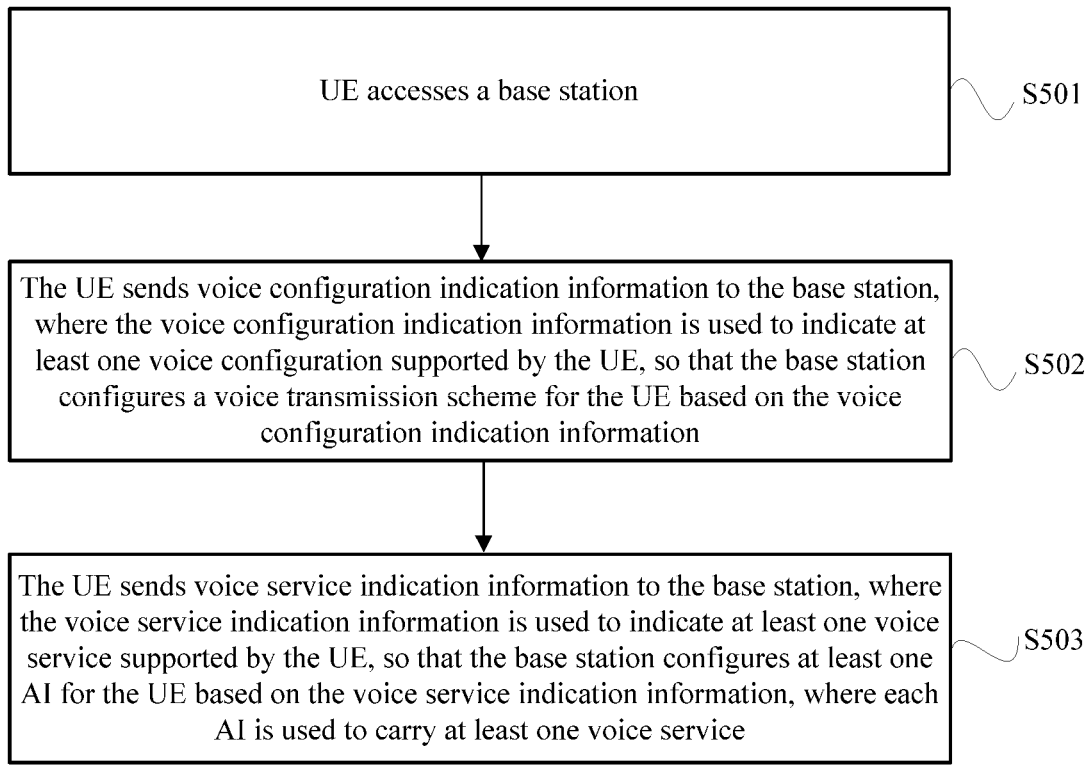
FIG. 6 is a flowchart of a voice service processing method according to one embodiment of the present disclosure.

FIG. 6 is a flowchart of a voice service processing method according to one embodiment of the present disclosure. As shown in FIG. 6, after S502, the voice service processing method provided in one embodiment of the present disclosure further includes the following operation:

S503. UE sends voice service indication information to a base station, where the voice service indication information is used to indicate at least one voice service supported by the UE, so that the base station configures at least one AI for the UE based on the voice service indication information, where each AI is used to carry at least one voice service.

Further, in the foregoing embodiment, the sending, by the UE, voice configuration indication information to the base station, where the voice configuration indication information is used to indicate at least one voice configuration supported by the UE, so that the base station configures a voice transmission scheme for the UE based on the voice configuration indication information includes the following several cases:

In a first case, the UE send first indication information to the base station, where the first indication information is used to indicate that the UE supports 5G and an NG-IMS, so that the base station configures a first voice transmission scheme for the UE based on the first indication information. The first voice transmission scheme is that a transmission path of a voice service is from a 5G CN to the NG-IMS.

In a second case, the UE sends second indication information to the base station, where the second indication information is used to indicate that the UE supports 5G and an IMS, so that the base station configures a second voice transmission scheme for the UE based on the second indication information. The second voice transmission scheme is that a transmission path of a voice service is from a 5G CN to the IMS.

In a third case, the UE sends third indication information to the base station, where the third indication information is used to indicate that the UE supports an MSC or an eMSC, so that the base station configures a third voice transmission scheme for the UE based on the third indication information. The third voice transmission scheme is that a transmission path of a voice service is from the MSC or the eMSC to an IMS.

The foregoing three cases may be performed on the UE side at the same time. In other words, the UE may send one of the first indication information, the second indication information, and the third indication information to the base station, so that the base station may configure one of the first voice transmission scheme, the second voice transmission scheme, and the third voice transmission scheme for the UE based on network load, a network policy, and a UE priority, and then perform a subsequent process based on the foregoing descriptions.

According to the voice service processing method provided in one embodiment of the present disclosure, the UE accesses the base station; and the UE sends the voice configuration indication information to the base station, where the voice configuration indication information is used to indicate the at least one voice configuration supported by the UE, so that the base station configures the voice transmission scheme for the UE based on the voice configuration indication information. In addition, the UE sends the voice service indication information to the base station, where the voice service indication information is used to indicate the at least one voice service supported by the UE, so that the base station configures the at least one AI for the UE based on the voice service indication information, and provides a 5G network voice solution, where each AI is used to carry at least one voice service; and the UE can initiate a voice service on a 5G network, and a high-quality and convenient voice service can be provided for a user.

Figure 7:
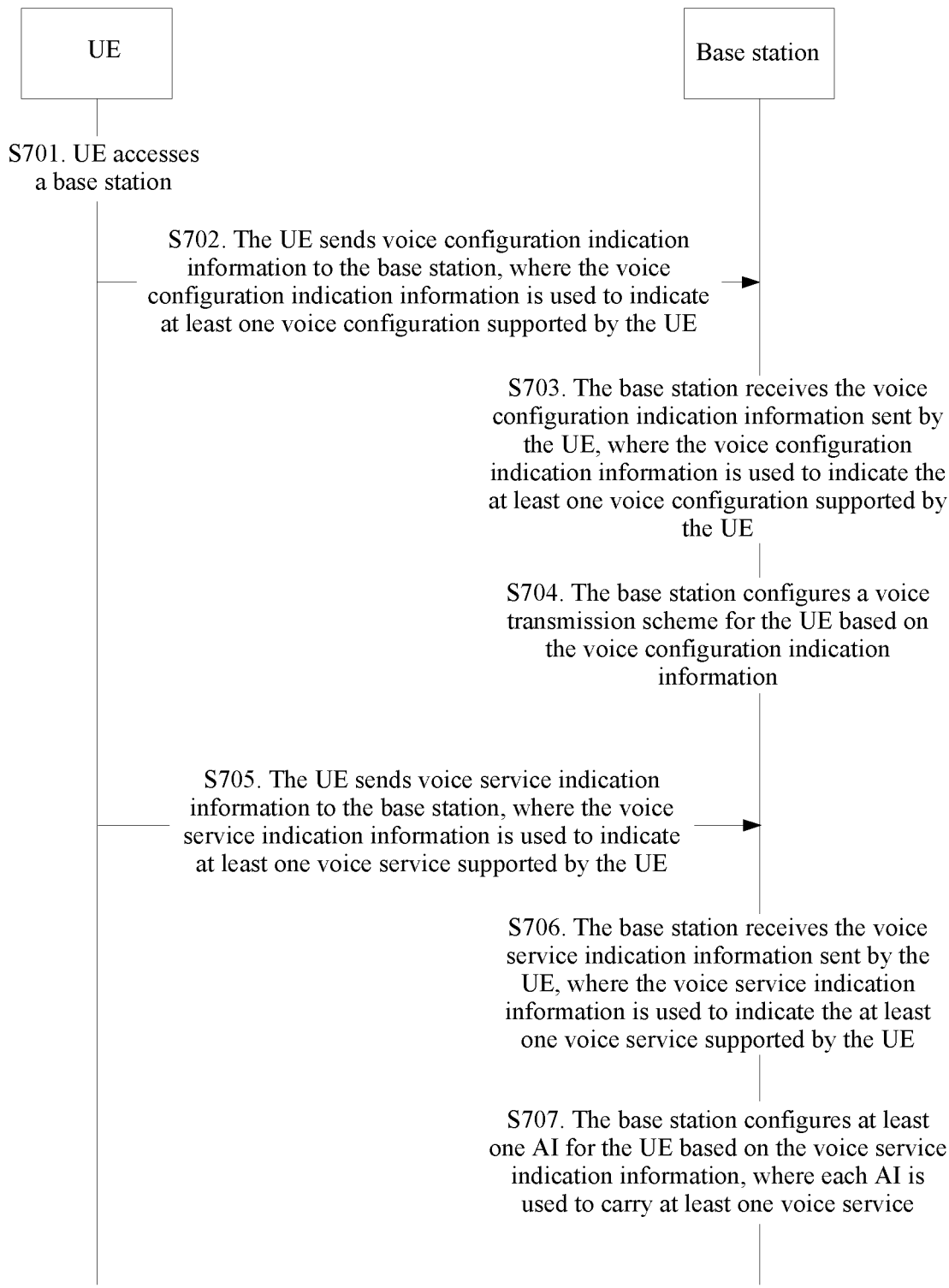
FIG. 7 is a signaling diagram of a voice service processing method according to an embodiment of the present disclosure.

FIG. 7 is a signaling diagram of a voice service processing method according to an embodiment of the present disclosure. As shown in FIG. 7, the voice service processing method provided in one embodiment of the present disclosure includes the following operations.

S701. UE accesses a base station.

S702. The UE sends voice configuration indication information to the base station, where the voice configuration indication information is used to indicate at least one voice configuration supported by the UE.

S703. The base station receives the voice configuration indication information sent by the UE, where the voice configuration indication information is used to indicate the at least one voice configuration supported by the UE.

S704. The base station configures a voice transmission scheme for the UE based on the voice configuration indication information.

S705. The UE sends voice service indication information to the base station, where the voice service indication information is used to indicate at least one voice service supported by the UE.

S706. The base station receives the voice service indication information sent by the UE, where the voice service indication information is used to indicate the at least one voice service supported by the UE.

S707. The base station configures at least one AI for the UE based on the voice service indication information, where each AI is used to carry at least one voice service.

According to the voice service processing method provided in one embodiment of the present disclosure, the UE accesses the base station, and the UE sends the voice configuration indication information to the base station, where the voice configuration indication information is used to indicate the at least one voice configuration supported by the UE; and the base station receives the voice configuration indication information sent by the UE, and the base station configures the voice transmission scheme for the UE based on the voice configuration indication information. In addition, the UE sends the voice service indication information to the base station, where the voice service indication information is used to indicate the at least one voice service supported by the UE; the base station receives the voice service indication information sent by the UE, and the base station configures the at least one AI for the UE based on the voice service indication information, and provides a 5G network voice solution, where each AI is used to carry at least one voice service; and the UE can initiate a voice service on a 5G network, and a high-quality and convenient voice service can be provided for a user.

Figure 8:
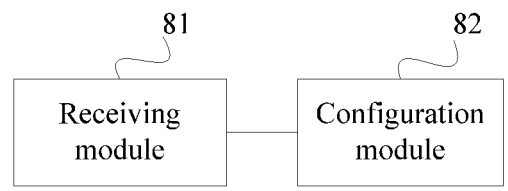
FIG. 8 is a schematic structural diagram of a base station according to one embodiment of the present disclosure.

FIG. 8 is a schematic structural diagram of a base station according to one embodiment of the present disclosure. As shown in FIG. 8, the base station provided in one embodiment of the present disclosure includes a receiving module 81 and a configuration module 82.

The receiving module 81 is configured to receive voice configuration indication information sent by UE, where the voice configuration indication information is used to indicate at least one voice configuration supported by the UE.

The configuration module 82 is configured to configure a voice transmission scheme for the UE based on the voice configuration indication information.

The base station provided in one embodiment of the present disclosure is configured to perform the technical solution of the method embodiment shown in FIG. 2. Implementation principles and technical effects thereof are similar. Details are not described herein again.

Further, in the embodiment shown in FIG. 8, the receiving module 81 is configured to receive first indication information sent by the UE, where the first indication information is used to indicate that the UE supports 5G and an NG-IMS.

The configuration module 82 is configured to configure a first voice transmission scheme for the UE based on the first indication information, where the first voice transmission scheme is that a transmission path of a voice service is from a 5G CN to an NG-IMS.

The configuration module 82 is configured to: establish a voice channel from the 5G CN to the NG-IMS based on the first indication information; and send a voice channel establishment indication message to the UE, where the voice channel establishment indication message is used to indicate that the transmission path of the voice service of the UE is from the 5G CN to the NG-IMS.

Further, in the embodiment shown in FIG. 8, the receiving module 81 is configured to receive second indication information sent by the UE, where the second indication information is used to indicate that the UE supports 5G and an IMS.

The configuration module 82 is configured to configure a second voice transmission scheme for the UE based on the second indication information, where the second voice transmission scheme is that a transmission path of a voice service is from a 5G CN to the IMS.

Further, in the embodiment shown in FIG. 8, the configuration module 82 is configured to: establish a voice channel from the 5G CN to the IMS based on the second indication information; and send a voice channel establishment indication message to the UE, where the voice channel establishment indication message is used to indicate that the transmission path of the voice service of the UE is from the 5G CN to the IMS.

Further, in the embodiment shown in FIG. 8, the receiving module 81 is configured to receive third indication information sent by the UE, where the third indication information is used to indicate that the UE supports an MSC or an eMSC.

The configuration module 82 is configured to configure a third voice transmission scheme for the UE based on the third indication information, where the third voice transmission scheme is that a transmission path of a voice service is from the MSC or the eMSC to an IMS.

Further, in the embodiment shown in FIG. 8, the configuration module 82 is configured to: establish a voice channel from the MSC or the eMSC to the IMS based on the third indication information; and send a voice channel establishment indication message to the UE, where the voice channel establishment indication message is used to indicate that the transmission path of the voice service of the UE is from the MSC or the eMSC to the IMS.

Further, in the embodiment shown in FIG. 8, the receiving module 81 is further configured to receive voice service indication information sent by the UE, where the voice service indication information is used to indicate at least one voice service supported by the UE.

The configuration module 82 is further configured to configure at least one AI for the UE based on the voice service indication information, where each AI is used to carry at least one voice service.

Further, in the embodiment shown in FIG. 8, the configuration module 82 is configured to: select at least one unoccupied AI based on the voice service indication information, and configure the at least one unoccupied AI for the UE; or select, based on the voice service indication information, at least one AI whose occupancy is less than a preset value, and configure, for the UE, the at least one AI whose occupancy is less than the preset value.

Figure 9:
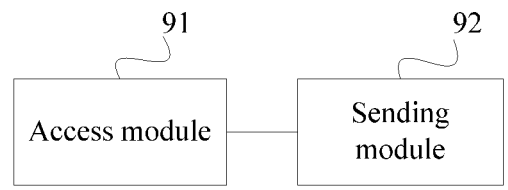
FIG. 9 is a schematic structural diagram of user equipment according to one embodiment of the present disclosure.

FIG. 9 is a schematic structural diagram of user equipment according to one embodiment of the present disclosure. As shown in FIG. 9, the user equipment provided in one embodiment of the present disclosure includes an access module 91 and a sending module 92.

The access module 91 is configured to access a base station.

The sending module 92 is configured to send voice configuration indication information to the base station after the UE accesses the base station, where the voice configuration indication information is used to indicate at least one voice configuration supported by the UE, so that the base station configures a voice transmission scheme for the UE based on the voice configuration indication information.

The user equipment provided in one embodiment of the present disclosure is configured to perform the technical solution of the method embodiment shown in FIG. 5. Implementation principles and technical effects thereof are similar. Details are not described herein again.

Further, in the embodiment shown in FIG. 9, the sending module 92 is configured to:

send first indication information to the base station, where the first indication information is used to indicate that the UE supports a $5^{th}$ generation (5G) wireless communications technology and a next generation IP multimedia subsystem (NG-IMS), so that the base station configures a first voice transmission scheme for the UE based on the first indication information, and the first voice transmission scheme is that a transmission path of a voice service is from a 5G core network (CN) to the NG-IMS; or send second indication information to the base station, where the second indication information is used to indicate that the UE supports a $5^{th}$ generation (5G) wireless communications technology and an IP multimedia subsystem (IMS), so that the base station configures a second voice transmission scheme for the UE based on the second indication information, and the second voice transmission scheme is that a transmission path of a voice service is from a 5G core network (CN) to the IMS; or send third indication information to the base station, where the third indication information is used to indicate that the UE supports a mobile switching center (MSC) or an enhanced mobile switching center (eMSC), so that the base station configures a third voice transmission scheme for the UE based on the third indication information, and the third voice transmission scheme is that a transmission path of a voice service is from the MSC or the eMSC to an IP multimedia subsystem (IMS).

Further, in the embodiment shown in FIG. 9, the sending module 92 is further configured to send voice service indication information to the base station, where the voice service indication information is used to indicate at least one voice service supported by the UE, so that the base station configures at least one AI for the UE based on the voice service indication information, where each AI is used to carry at least one voice service.

Figure 10:
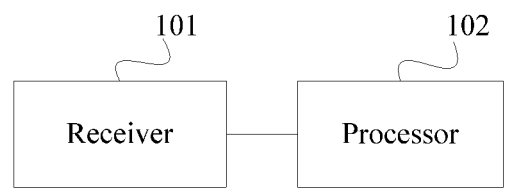
FIG. 10 is a schematic structural diagram of a base station according to one embodiment of the present disclosure.

FIG. 10 is a schematic structural diagram of a base station according to one embodiment of the present disclosure. As shown in FIG. 10, the base station provided in one embodiment of the present disclosure includes a receiver 101 and a processor 102.

The receiver 101 is configured to receive voice configuration indication information sent by UE, where the voice configuration indication information is used to indicate at least one voice configuration supported by the UE.

The processor 102 is configured to configure a voice transmission scheme for the UE based on the voice configuration indication information.

The base station provided in one embodiment of the present disclosure is configured to perform the technical solution of the method embodiment shown in FIG. 2. Implementation principles and technical effects thereof are similar. Details are not described herein again.

Further, in the embodiment shown in FIG. 10, the receiver 101 is configured to: receive first indication information sent by the UE, where the first indication information is used to indicate that the UE supports 5G and an NG-IMS.

The processor 102 is configured to: configure a first voice transmission scheme for the UE based on the first indication information, where the first voice transmission scheme is that a transmission path of a voice service is from a 5G CN to the NG-IMS.

Further, in the embodiment shown in FIG. 10, the processor 102 is configured to: establish a voice channel from the 5G CN to the NG-IMS based on the first indication information; and send a voice channel establishment indication message to the UE, where the voice channel establishment indication message is used to indicate that the transmission path of the voice service of the UE is from the 5G CN to the NG-IMS.

Further, in the embodiment shown in FIG. 10, the receiver 101 is configured to: receive second indication information sent by the UE, where the second indication information is used to indicate that the UE supports 5G and an IMS.

The processor 102 is configured to: configure a second voice transmission scheme for the UE based on the second indication information, where the second voice transmission scheme is that a transmission path of a voice service is from a 5G CN to the IMS.

Further, in the embodiment shown in FIG. 10, the processor 102 is configured to: establish a voice channel from the 5G CN to the IMS based on the second indication information; and send a voice channel establishment indication message to the UE, where the voice channel establishment indication message is used to indicate that the transmission path of the voice service of the UE is from the 5G CN to the IMS.

Further, in the embodiment shown in FIG. 10, the receiver 101 is configured to: receive third indication information sent by the UE, where the third indication information is used to indicate that the UE supports an MSC or an eMSC.

The processor 102 is configured to: configure a third voice transmission scheme for the UE based on the third indication information, where the third voice transmission scheme is that a transmission path of a voice service is from the MSC or the eMSC to an IMS.

Further, in the embodiment shown in FIG. 10, the processor 102 is configured to: establish a voice channel from the MSC or the eMSC to the IMS based on the third indication information; and send a voice channel establishment indication message to the UE, where the voice channel establishment indication message is used to indicate that the transmission path of the voice service of the UE is from the MSC or the eMSC to the IMS.

Further, in the embodiment shown in FIG. 10, the receiver 101 is further configured to: receive voice service indication information sent by the UE, where the voice service indication information is used to indicate at least one voice service supported by the UE.

The processor 102 is further configured to: configure at least one AI for the UE based on the voice service indication information, where each AI is used to carry at least one voice service.

Further, in the embodiment shown in FIG. 10, the processor 102 is configured to: select at least one unoccupied AI based on the voice service indication information, and configure the at least one unoccupied AI for the UE; or select, based on the voice service indication information, at least one AI whose occupancy is less than a preset value, and configure, for the UE, the at least one AI whose occupancy is less than the preset value.

Figure 11:
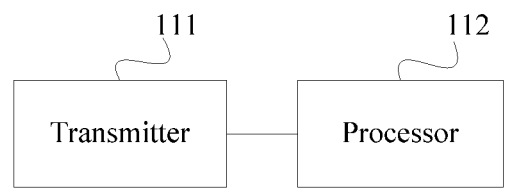
FIG. 11 is a schematic structural diagram of user equipment according to one embodiment of the present disclosure.

FIG. 11 is a schematic structural diagram of user equipment according to one embodiment of the present disclosure. As shown in FIG. 11, the user equipment provided in one embodiment of the present disclosure includes a transmitter 111 and a processor 112.

The processor 112 is configured to access a base station.

The transmitter 111 is configured to send voice configuration indication information to the base station, where the voice configuration indication information is used to indicate at least one voice configuration supported by the UE, so that the base station configures a voice transmission scheme for the UE based on the voice configuration indication information.

The user equipment provided in one embodiment of the present disclosure is configured to perform the technical solution of the method embodiment shown in FIG. 5. Implementation principles and technical effects thereof are similar. Details are not described herein again.

Further, in the embodiment shown in FIG. 11, the transmitter 111 is configured to:

send first indication information to the base station, where the first indication information is used to indicate that the UE supports 5G and an NG-IMS, so that the base station configures a first voice transmission scheme for the UE based on the first indication information, and the first voice transmission scheme is that a transmission path of a voice service is from a 5G CN to the NG-IMS; or send second indication information to the base station, where the second indication information is used to indicate that the UE supports a $5^{th}$ generation (5G) wireless communications technology and an IMS, so that the base station configures a second voice transmission scheme for the UE based on the second indication information, and the second voice transmission scheme is that a transmission path of a voice service is from a 5G CN to the IMS; or send third indication information to the base station, where the third indication information is used to indicate that the UE supports an MSC or an eMSC, so that the base station configures a third voice transmission scheme for the UE based on the third indication information, and the third voice transmission scheme is that a transmission path of a voice service is from the MSC or the eMSC to an IMS.

Further, in the embodiment shown in FIG. 11, the transmitter 111 is further configured to: send voice service indication information to the base station, where the voice service indication information is used to indicate at least one voice service supported by the UE, so that the base station configures at least one AI for the UE based on the voice service indication information, where each AI is used to carry at least one voice service.

Figure 12:
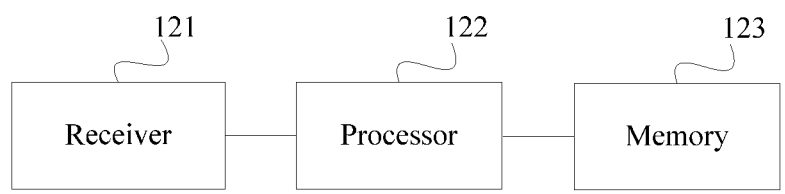
FIG. 12 is a schematic structural diagram of a base station according to one embodiment of the present disclosure.

FIG. 12 is a schematic structural diagram of a base station according to one embodiment of the present disclosure. As shown in FIG. 12, the base station provided in one embodiment of the present disclosure includes a receiver 121, a processor 122, and a memory 123.

For example, the receiver 121 is configured to receive voice configuration indication information sent by UE, where the voice configuration indication information is used to indicate at least one voice configuration supported by the UE. The memory 123 is configured to store an execution instruction. The processor 122 may be a central processing unit (CPU), an application-specific integrated circuit (ASIC), or one or more integrated circuits implementing one embodiment of the present disclosure. When the base station runs, the processor 122 communicates with the memory 123, and the processor 122 invokes the execution instruction, to perform the following operation: configuring a voice transmission scheme for the UE based on the voice configuration indication information.

The receiver 121 is configured to receive first indication information sent by the UE, where the first indication information is used to indicate that the UE supports 5G and an NG-IMS.

The processor 122 is further configured to perform the following operation: configuring a first voice transmission scheme for the UE based on the first indication information, where the first voice transmission scheme is that a transmission path of a voice service is from a 5G CN to the NG-IMS.

The processor 122 is further configured to perform the following operation: establishing a voice channel from the 5G CN to the NG-IMS based on the first indication information; and sending a voice channel establishment indication message to the UE, where the voice channel establishment indication message is used to indicate that the transmission path of the voice service of the UE is from the 5G CN to the NG-IMS.

The receiver 121 is configured to receive second indication information sent by the UE, where the second indication information is used to indicate that the UE supports 5G and an IMS.

The processor 122 is further configured to perform the following operation: configuring a second voice transmission scheme for the UE based on the second indication information, where the second voice transmission scheme is that a transmission path of a voice service is from a 5G CN to the IMS.

The processor 122 is further configured to perform the following operation: establishing a voice channel from the 5G CN to the IMS based on the second indication information; and sending a voice channel establishment indication message to the UE, where the voice channel establishment indication message is used to indicate that the transmission path of the voice service of the UE is from the 5G CN to the IMS.

The receiver 121 is configured to receive third indication information sent by the UE, where the third indication information is used to indicate that the UE supports an MSC or an eMSC.

The processor 122 is further configured to perform the following operation: configuring a third voice transmission scheme for the UE based on the third indication information, where the third voice transmission scheme is that a transmission path of a voice service is from the MSC or the eMSC to an IMS.

The processor 122 is further configured to perform the following operation: establishing a voice channel from the MSC or the eMSC to the IMS based on the third indication information; and sending a voice channel establishment indication message to the UE, where the voice channel establishment indication message is used to indicate that the transmission path of the voice service of the UE is from the MSC or the eMSC to the IMS.

The receiver 121 is further configured to receive voice service indication information sent by the UE, where the voice service indication information is used to indicate at least one voice service supported by the UE.

The processor 122 is further configured to perform the following operation: configuring at least one AI for the UE based on the voice service indication information, where each AI is used to carry at least one voice service.

The processor 122 is further configured to perform the following operation: selecting at least one unoccupied AI based on the voice service indication information, and configuring the at least one unoccupied AI for the UE; or selecting, based on the voice service indication information, at least one AI whose occupancy is less than a preset value, and configuring, for the UE, the at least one AI whose occupancy is less than the preset value.

Figure 13:
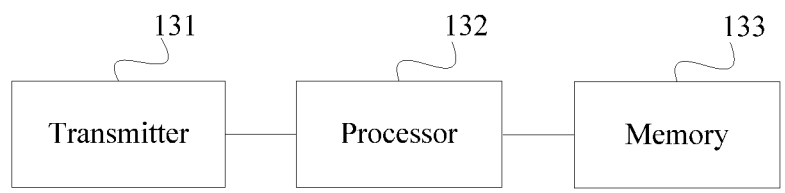
FIG. 13 is a schematic structural diagram of user equipment according to one embodiment of the present disclosure.

FIG. 13 is a schematic structural diagram of user equipment according to one embodiment of the present disclosure. As shown in FIG. 13, the user equipment provided in one embodiment of the present disclosure includes a transmitter 131, a processor 132, and a memory 133.

For example, the memory 133 is configured to store an execution instruction. The processor 132 may be a central processing unit (CPU), an application-specific integrated circuit (ASIC), or one or more integrated circuits implementing one embodiment of the present disclosure. When the user equipment runs, the processor 132 communicates with the memory 133, and the processor 132 invokes the execution instruction, to perform the following operation: accessing a base station.

The processor 132 invokes the execution instruction, to control the transmitter 131 to perform the following operation: sending voice configuration indication information to the base station, where the voice configuration indication information is used to indicate at least one voice configuration supported by the UE, so that the base station configures a voice transmission scheme for the UE based on the voice configuration indication information.

The transmitter 131 is further configured to perform the following operation:

sending first indication information to the base station, where the first indication information is used to indicate that the UE supports 5G and an NG-IMS, so that the base station configures a first voice transmission scheme for the UE based on the first indication information, and the first voice transmission scheme is that a transmission path of a voice service is from a 5G CN to the NG-IMS; or sending second indication information to the base station, where the second indication information is used to indicate that the UE supports a $5^{th}$ generation (5G) wireless communications technology and an IMS, so that the base station configures a second voice transmission scheme for the UE based on the second indication information, and the second voice transmission scheme is that a transmission path of a voice service is from a 5G CN to the IMS; or sending third indication information to the base station, where the third indication information is used to indicate that the UE supports an MSC or an eMSC, so that the base station configures a third voice transmission scheme for the UE based on the third indication information, and the third voice transmission scheme is that a transmission path of a voice service is from the MSC or the eMSC to an IMS.

The transmitter 131 is further configured to perform the following operation: sending voice service indication information to the base station, where the voice service indication information is used to indicate at least one voice service supported by the UE, so that the base station configures at least one AI for the UE based on the voice service indication information, where each AI is used to carry at least one voice service.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the operations of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

Finally, it should be noted that the foregoing embodiments are merely intended for describing the technical solutions of the present disclosure, but not for limiting the embodiments of the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A voice service processing method, comprising:
   accessing, by a user equipment (UE), a base station; and
   sending, by the UE, voice configuration indication information to the base station, wherein the voice configuration indication information is used to indicate a voice configuration supported by the UE, so that the base station configures a voice transmission scheme for the UE based on the voice configuration indication information wherein the voice configuration indication information comprises a first voice configuration indicator that is configured to indicate that the UE supports a $5^{th}$ generation (5G) wireless communications technology and a next generation IP multimedia subsystem (NG-IMS), so that the base station configures the voice transmission scheme comprising a first transmission path of the voice service for the UE that is from a 5G core network (CN) to the NG-IMS based on the first voice configuration indicator, wherein the voice configuration indication information comprises a second voice configuration indicator that is configured to indicate that the UE supports the 5G wireless communications technology and a first IMS, so that the base station configures the voice transmission scheme comprising a second transmission path of the voice service for the UE that is from the 5G CN to the first IMS based on the second voice configuration indicator, and wherein the voice configuration indication information comprises a third voice configuration indicator that is configured to indicate that the UI supports a mobile switching center (MSC), so that the base station configures the voice transmission scheme comprising a third transmission path of the voice service for the UE that is from the MSC to the first IMS based on the third configuration indicator.

2. The method according to claim 1, after sending the voice configuration indication information, further comprising:
   sending, by the UE, voice service indication information to the base station, wherein the voice service indication information is used to indicate at least one voice service supported by the UE, so that the base station configures at least one air interface (AI) for the UE based on the voice service indication information, wherein each AI is used to carry at least one voice service.

3. A base station, comprising:
   a receiver, configured to receive a voice configuration indication information from a user equipment (UE), wherein the voice configuration indication information is used to indicate a voice configuration supported by the UE; and
   a processor, configured to configure a voice transmission scheme for the UE based on the voice configuration indication information wherein the voice configuration indication information comprises a first voice configuration indicator that is configured to indicate that the UE supports a $5^{th}$ generation (5G) wireless communications technology and a next generation IP multimedia subsystem (NG-IMS) wherein the processor is to configure the voice transmission scheme comprising a first transmission path of the voice service for the UE that is from a 5G core network (CN) to the NG-IMS based on the first voice configuration indicator, wherein the voice configuration indication information comprises a second voice configuration indicator that is configured to indicate that the UE supports the 5G wireless communications technology and a first IMS, wherein the processor is to configure the voice transmission scheme comprising a second transmission path of the voice service for the UE that is from the 5G CN to the first IMS based on the second voice configuration indicator, and wherein the voice configuration indication information comprises a third voice configuration indicator that is configured to indicate that the UE supports a mobile switching center (MSC), wherein the processor is to configure the voice transmission scheme comprising a third transmission path of the voice service for the UE that is from the MSC to the first IMS based on the third configuration indicator.

4. The base station according to claim 3, wherein the first transmission path of the voice service comprises a first voice channel, and wherein the processor is configured to:
   establish the first voice channel from the 5G CN to the NG-IMS based on the first voice configuration indicator; and send a voice channel establishment indication message to the UE, wherein the voice channel establishment indication message is used to indicate that the first transmission path of the voice service is from the UE through the 5G CN to the NG-IMS.

5. The base station according to claim 3, wherein the second transmission path comprises a second voice channel and wherein the processor is configured to:
  establish the second voice channel from the 5G CN to the IMS based on the second voice configuration indicator; and send a voice channel establishment indication message to the UE, wherein the voice channel establishment indication message is used to indicate that the second transmission path of the voice service is from the UE through the 5G CN to the IMS.

6. The base station according to claim 3, wherein the third transmission path comprises a third voice channel and wherein the processor is configured to:
  establish the third voice channel from the MSC to the IMS based on the third voice configuration indicator; and send a voice channel establishment indication message to the UE, wherein the voice channel establishment indication message is used to indicate that the third transmission path of the voice service is from the UE through the MSC to the IMS.

7. The base station according to claim 3, wherein the receiver is further configured to:
  receive voice service indication information from the UE, wherein the voice service indication information is used to indicate at least one voice service supported by the UE; and
  the processor is further configured to:
  configure at least one air interface (AI) for the UE based on the voice service indication information, wherein each AI is used to carry at least one voice service.

8. The base station according to claim 7, wherein the processor is configured to:
  select at least one unoccupied AI based on the voice service indication information, and configure the at least one unoccupied AI for the UE.

9. The base station according to claim 7, wherein the processor is configured to:
  select, based on the voice service indication information, at least one AI whose occupancy is less than a preset value, and configure, for the UE, the at least one AI whose occupancy is less than the preset value.

10. A user equipment (UE), comprising:
  a processor, configured to access a base station; and
  a transmitter, configured to send voice configuration indication information to the base station after the UE accesses the base station, wherein the voice configuration indication information is used to indicate a voice configuration supported by the UE, so that the base station configures a voice transmission scheme for the UE based on the voice configuration indication information wherein the voice configuration indication information comprises a first voice configuration indicator that is configured to indicate that the UE supports a $5^{th}$ generation (5G), wireless communications technology and a next generation IP multimedia subsystem (NG-IMS) so that the base station configures the voice transmission scheme comprising a first transmission path of the voice service for the UE that is from the 5G CN to the NG-IMS based on the first voice configuration indicator, wherein the voice configuration indication information comprises a second voice configuration indicator that is configured to indicate that the UE supports the 5G wireless communications technology and a first IMS, so that the base station configures the voice transmission scheme comprising a second transmission path of the voice service for the UE that is from a 5G core network (CN) to the first IMS based on the second voice configuration indicator, and wherein the voice configuration indication information comprises a third voice configuration indicator that is configured to indicate that the UE supports a mobile switching center (MSC), so that the base station configures the voice transmission scheme comprising a third transmission path of the voice service for the UE that is from the MSC to the first IMS based on the third configuration indicator.

11. The user equipment according to claim 10, wherein the transmitter is further configured to:
  send voice service indication information to the base station, wherein the voice service indication information is used to indicate at least one voice service supported by the UE, so that the base station configures at least one air interface (AI) for the UE based on the voice service indication information, wherein each AI is used to carry at least one voice service.

* * * * *

UNITED STATES PATENT AND TRADEMARK OFFICE
CERTIFICATE OF CORRECTION

PATENT NO.         : 10,966,208 B2
APPLICATION NO.    : 16/123076
DATED              : March 30, 2021
INVENTOR(S)        : Jun Chen and Xiaoxiao Zheng Page 1 of 1

It is certified that error appears in the above-identified patent and that said Letters Patent is hereby corrected as shown below:

In the Claims

In Claim 1, Column 20, Line 8, delete "UI supports" and insert --UE supports--.

In Claim 10, Column 22, Line 11, delete "generation (5G), wireless" and insert --generation (5G) wireless--.

In Claim 10, Column 22, Line 15-16, delete "UE that is from the 5G CN to the NG-IMS" and insert --UE that is from a 5G core network (CN) to the NG-IMS--.

In Claim 10, Column 22, Line 23-24, delete "UE that is from a 5G core network (CN) to the first IMS" and insert --UE that is from the 5G CN to the first IMS--.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*